United States Patent
Prusa et al.

(10) Patent No.: US 8,468,121 B1
(45) Date of Patent: Jun. 18, 2013

(54) RESOLVING RESOURCE TIME INTERVALS IN A DISTRIBUTED SYSTEM

(75) Inventors: Jerry Prusa, Saratoga, CA (US);
Jayaprakash Krishnan, San Jose, CA (US); Bhupendra Singh, Fremont, CA (US); Raju Viswambharan, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 50 days.

(21) Appl. No.: 13/248,682

(22) Filed: Sep. 29, 2011

(51) Int. Cl.
*G06F 17/00* (2006.01)
(52) U.S. Cl.
USPC ........... 707/602; 707/603; 707/604; 707/609; 707/822; 707/828
(58) Field of Classification Search
USPC ................................. 707/600–899
See application file for complete search history.

(56) References Cited

U.S. PATENT DOCUMENTS

| 6,253,065 | B1 | 6/2001 | Palmer |
| 6,614,902 | B1 | 9/2003 | Rizzetto |
| 7,003,091 | B1 | 2/2006 | Burns et al. |
| 2006/0198430 | A1* | 9/2006 | Rhee et al. ............. 375/222 |
| 2010/0058234 | A1 | 3/2010 | Salame et al. |

FOREIGN PATENT DOCUMENTS

| EP | 1806912 A1 | 7/2007 |
| WO | WO 2010/025113 A1 | 3/2010 |

* cited by examiner

*Primary Examiner* — Isaac M Woo
(74) *Attorney, Agent, or Firm* — Tarolli, Sundheim, Covell & Tummino LLP

(57) ABSTRACT

In one example embodiment, a method can include determining resource time data for an update contact data record corresponding to a state of a given resource in a distributed contact center system. A repository can be queried for conflicting data records associated with the given resource based on the resource time data. Any inconsistency for the resource time data can be resolved based on results to the querying and the update contact data record.

20 Claims, 3 Drawing Sheets

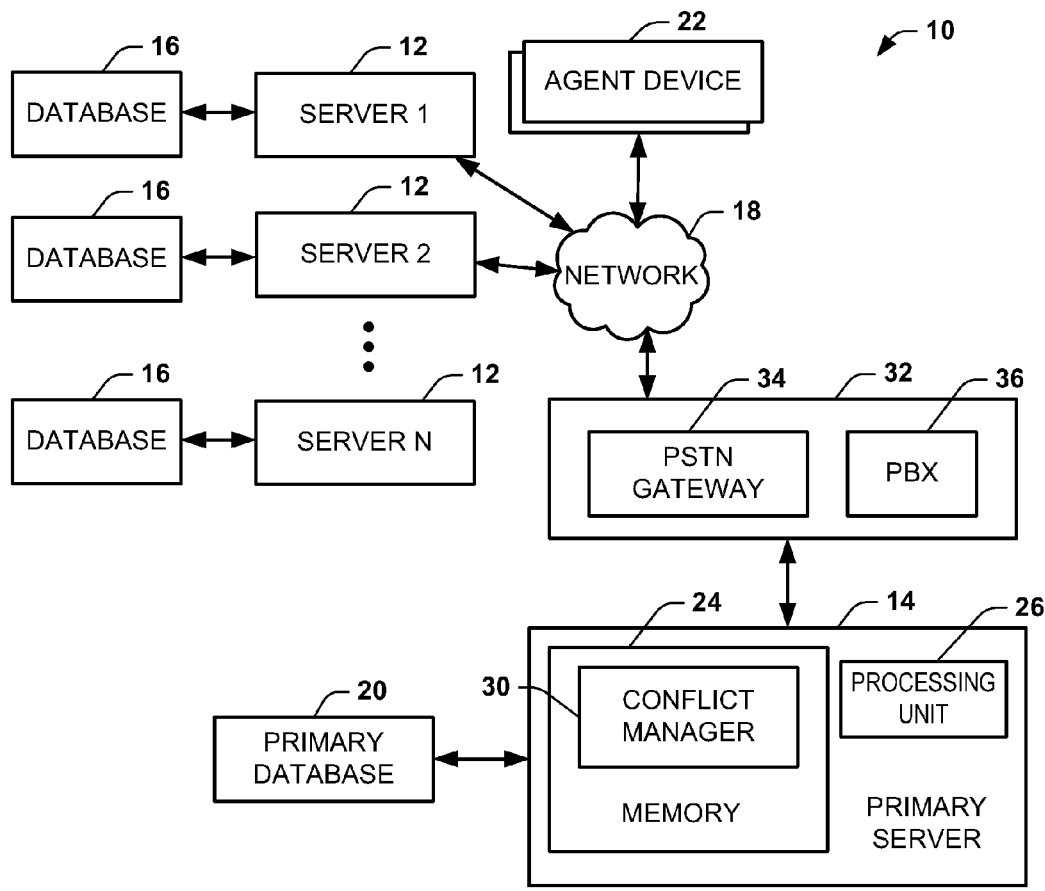

FIG. 1

```
SELECT * FROM resourceactivity WHERE
ResourceID='<incoming ID>'
AND (State='5' OR State='6') AND (
  (('<incoming start time>' >= StartTimeStamp) AND
  ('<incoming start time>' <= EndTimeStamp) )
OR (('<incoming end time>' >= StartTimeStamp) AND
      ('<incoming end time>' <= EndTimeStamp) )
OR (('<incoming start time>' < StartTimeStamp) AND
      ('<incoming end time>' > EndTimeStamp) )
OR (('<incoming start time>' >= StartTimeStamp) AND
      (EndTimeStamp IS NULL) )
OR (('<incoming start time>' <= StartTimeStamp) AND
      (StartTimeStamp <= '<incoming end time>') AND
(EndTimeStamp IS NULL) )
```

RESOLVING RESOURCE TIME INTERVALS IN A DISTRIBUTED SYSTEM

TECHNICAL FIELD

This disclosure relates to resolving resource time intervals in a distributed system, such as a contact center system.

BACKGROUND

Contact centers, often referred to as call centers, are utilized by many business entities for the purpose of receiving and transmitting a large volume of requests by telephone or other forms of communication, such as email, online chat, website information exchange, fax, and instant messaging. In addition to servicing incoming requests to the company, the call center or contact center can also be utilized for outgoing communication, such as for telemarketing, contacting clientele, and debt collection.

While additional flexibility may be afforded by implementing a contact center within a distributed manner, such an arrangement is susceptible to data inconsistencies. These and other issues can arise, for example, in the event of an equipment failure or loss of connection.

SUMMARY

This disclosure relates to resolving resource time intervals in a distributed system, such as can be implemented for a contact center.

As one example, a system can include memory for storing computer readable instructions and a processing unit for accessing the memory and executing the computer readable instructions. The computer readable instructions can include a conflict manager programmed to receive a message from a remote server following a re-connection between the remote server and a primary server. The message from the remote server can include a resource time interval associated with a state of a given resource in a distributed system. The conflict manager is programmed to derive a corrected resource time interval for the state of the given resource based on the message from the remote server and conflicting records in a primary database.

As another example, a method can include determining resource time data for an update contact data record corresponding to a state of a given resource in a distributed contact center system. A repository can be queried for conflicting data records associated with the given resource based on the resource time data. Any inconsistency for the resource time data can be resolved based on results to the querying and the update contact data record.

As yet another example, a distributed contact center system can include a plurality of distributed servers comprising a primary server and at least one remote server connected via a communications link. A plurality of distributed databases are configured to store contact center data. A conflict manager, programmed at one of the plurality of distributed servers, can derive a corrected resource time interval for a state of a given resource in the contact center system based on analysis of a set of at least one conflicting contact data records for the given resource stored as part of the contact center data.

BRIEF DESCRIPTION OF THE DRAWINGS

FIG. 1 depicts an example of a distributed contact center system according to an embodiment.

FIG. 3 depicts an example query statement that can be utilized to locate conflicting data records.

DETAILED DESCRIPTION

Figure 2:
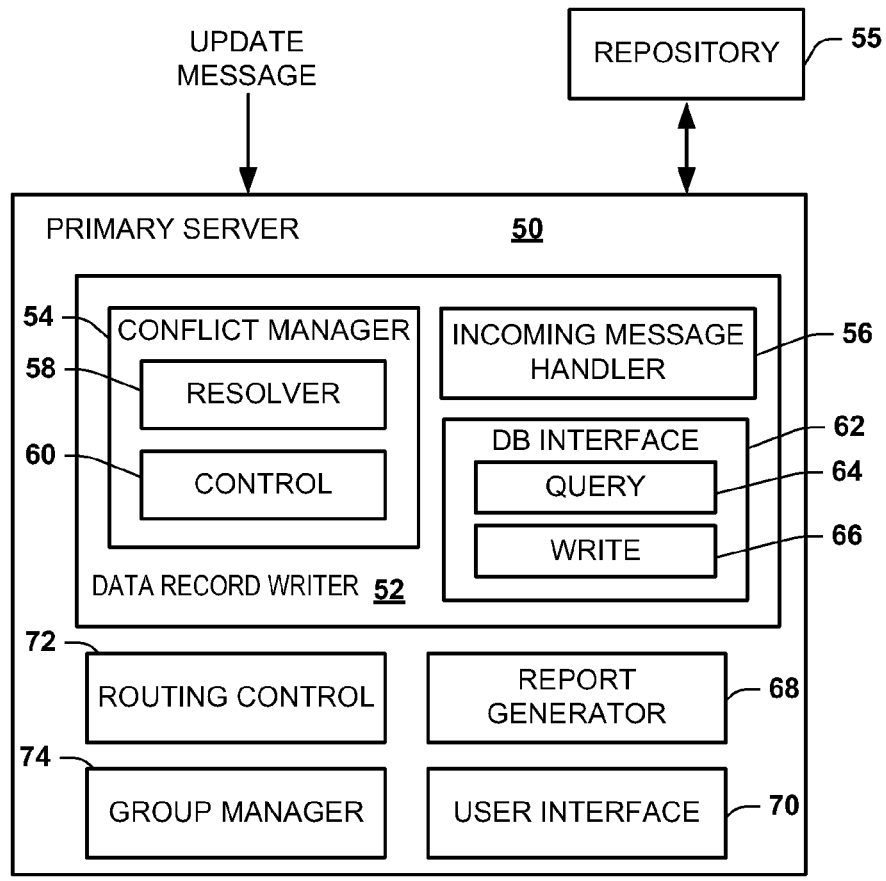
FIG. 2 depicts an example of a primary server that can manage conflicting resource time data according to an embodiment.

This disclosure relates to resolving resource time information in a distributed system, such as a distributed contact center system. In a distributed system where servers and databases may be distributed, inconsistent data about a shared resource may be stored in different places. The systems and methods disclosed herein operate to identify and correct inconsistencies associated with resource time information associated with the state of resources in the system. As used herein, in the context of a contact center system, resources can include agents, equipment, services or the like. Each such resource can have one or more associated state that describes a condition or parameter. The system further can track in a corresponding time interval for each such state of a given resource, which can be stored and maintained in the system 10 as part of a data record (e.g., in a contact data record).

Turning to the figures, FIG. 1 depicts an example of a contact center system 10 configured in a distributed manner. Such a distributed contact center system 10 can include a plurality of distributed servers as well as distributed databases for storage of relevant data and implementing contact center operations. As part of such operations, the system 10 can be programmed to maintain accurate resource time interval data for resources in the contact center system. By way of example, the resource time interval can correspond to a user or agent log-in time interval, a time interval associated with a physical asset (e.g., phone line or trunk, such as an agent trunk, an idle time interval associated with a phone line or trunk), or a wrapup time interval for a transaction or call within a contact center to name a few. As used herein, a wrapup time corresponds to the time required by an agent after a transaction (e.g., a conversation or email session) has ended, to complete work that is directly associated with the transaction just completed. The wrapup time interval data associated with a wrapup event for a given agent or agent trunk can also include a group identifier to track the group and corresponding server for which the wrapup applies.

The system 10 is implemented as a distributed system in which there can be any number of servers 12, demonstrated as server 1, server 2 thru server N, where N is a positive integer denoting the number of remote distributed servers in the contact center system 10 (e.g., N is greater than or equal to 1). The system 10 also includes a primary server 14, sometimes referred to as a headquarters (HQ) server, which operates as a primary server for use in implementing the contact center services. For example, the primary server 14 can be assigned the highest hierarchy for routing calls and other forms of communication within the contact center 10. Each of the additional servers 12 within the distributed contact center system 10 thus can be assigned a hierarchy relative to that of the primary server 14.

Each of the servers 12 can also include one or more associated database, indicated schematically at 16. Each server 12 can be connected to one or more database though a connection, which can be a direct or network connection. There can be any number of distributed servers 12, a primary server 14 and distributed databases 16 in the contact center system 10. Each of the servers 12 and the primary server 14 can be connected to each other via a network 18. The primary server 14 can be located at a fixed location (e.g., a headquarters), for example. The network 18 can include any combination of physical or virtual networks, such as including a wide area network (WAN), one or more local area networks (LANs) as well as a combination of LANs and WANs, and further may be implemented as including a wireless and/or non-wireless (e.g., fiber optic or electrically conductive) communication technologies.

The system 10 also includes a primary database 20 that stores a set of primary data for the contact center system. During normal operation, each of the remote distributed databases 16 can include a copy of the contact center data, such as can be replicated from the primary database 20. The replication can occur unidirectionally from the primary database 20 to the remote database 16. Alternatively or additionally, replication can be bidirectional between the respective databases.

During normal operation each of the servers 12 and the primary server 14 remain in communication via respective communications link, for example, through the network 18. Those skilled in the art will understand and appreciate various forms of communication links and tunneling that may be utilized to maintain the connection between the servers and the databases. However, since the servers 12 and database 16 are distributed throughout the system 10 certain data can become inconsistent in situations where coordination of such data throughout the system is not possible. This can occur, for example, when a network outage occurs or a given server experiences a failure or a connection is otherwise lost between respective servers. If such a connection loss occurs, for example, each of the respective servers 12 and 14 can operate independently from each other to maintain operation of the contact center system 10. As a result, data representing resource time intervals associated with a state of a given resource can be stored inconsistently across the system during the connection condition.

In the example of the contact center system 10, there can be any number of agent devices 22 with which a respective agent can interact with the system. For example, an agent can employ an agent device 22 to log into the system 10 or log out of the system, such as via a secure or other form of connection through the network 18. An agent device 22 can reside locally (e.g., at a common facility) relative to the server 12 or 14, such as connected via a local network (e.g., a LAN) or it can reside remotely, such as being connected via a WAN to one or more of the servers 12 or 14. A user can log into the system by entering a username and password, such as part of an established login procedure. When an agent is logged into the contact center system 10, the contact center system is configured to log the given agent into each group (e.g., each group) to which that agent has been assigned.

As an example, each call or other form of inbound communication into a predefined intelligent routing number (IRN) IRN of the contact center system 10 can thus be routed to a respective agent that has been logged into the system via a corresponding agent device 22. As used herein, an IRN corresponds to an entry point to the routing system or contact center. The routing can occur based upon routing rules that have been established for the contact center system 10. Assume, for example, one or more of the respective servers 12 correspond to group servers configured for handling interactions and storing data relating to a corresponding group of agents (or multiple groups). Routing rules can select an agent that has logged into the system as an endpoint destination. For instance, when an interaction is routed to one of the group servers 12, based on application of routing rules, the server thus can be configured to connect such interaction to a selected agent that is logged into the system and thus has also been logged into a group that is serviced by the respective server 12, 14.

In circumstances where a connection between one or more remote server 12 and the primary server 14 is lost, the resource time data, such as associated with the state of a given resource (e.g., agent log-in or log out times), can be inconsistent across the system. For example, an agent can log-in or log-out of the system while a server is disconnected, such that data inconsistencies for shared resources may result. Once the connection is restored, the inconsistent data must be resolved, including data representing resource time intervals.

By way of example, the primary server 14 includes memory 24 that can store computer readable instructions and data and a processing unit 26. The processing unit 26 can access the memory and execute instructions that are stored therein. In the example of FIG. 1, the memory 24 includes a conflict manager 30 that is programmed to remedy data inconsistencies that can result due to disconnected servers and/or databases in the distributed system 10. The conflict manager 30 can receive a message from a remote server, such as following a reconnection between the remote server 12 and the primary server 14. Such message may include data representing a resource time interval associated with a state of a given resource. As mentioned above, the data can be inconsistent with data in one or more of the other databases 16 or 20. The conflict manager 30 thus is programmed to analyze corresponding data for the state of a given resource (e.g., an agent) and resolve the inconsistency based upon the information in the message that was received and any conflicting records that may be stored in the system (e.g., in the primary database 20 or any of the other databases 16).

As a further example, the conflict manager 30 can evaluate the set of conflicting records associated with the state of a given resource, if any, and create a record that includes a corrected resource time interval for the resource. The conflict manager 30 can insert the corrected record into the primary database 20 or other data repository. The conflict manager 30 can derive the corrected resource time interval by aggregating information from the resource time interval data derived from records stored during a disconnection. For example, messages can be queued on one or more remote servers 12 during a disconnected condition and be forwarded to the primary server for use by the conflict manager 30 once the connection is reestablished. In another example, the corrected resource time interval can be derived from conflicting records stored in the in the primary database 20 as well as from messages received from one of the remote servers 12 and/or from the remote databases 16. Alternatively, the corrected time interval information can correspond to the data representing the resource time interval in a given message that is received from the remote server 12 or one of the other conflicting records, if determined to be accurate for the shared resource.

For the example where the resource time interval corresponds to a log-in and log-out time for a given agent, the conflict manager 30 can derive the corrected resource time interval from one or more records containing the earliest log-in time and the latest log out time. The conflict manager 30 can resolve the inconsistency in the resource time interval data in real time or near real time to facilitate subsequent use of the resource time interval by other functions and methods that may be implemented in the contact center system. For example, a database layer within the contact center can automatically invoke the conflict manager each time a connection is reestablished. Alternatively, the conflict manager 30 can be invoked to correct the resource time interval data periodically (e.g., according to a predefined schedule) or at one or more predetermined times during the day (e.g., at a fixed time or based on system activity).

As another example, the conflict manager 30 can resolve data inconsistencies in a just-in-time (JIT) manner, such as by triggering the conflict manager each time the relevant data is fetched by a corresponding application. The data can be requested for use by such applications. Additionally, the conflict manager 30 can store the corrected record into the primary database and delete the other conflicting records from the system 10 as to provide consistent data across the system. The corresponding corrected data can, in turn, be replicated to the other databases 16.

In the example contact center system 10 of FIG. 1, the primary server 14 is coupled to a private branch exchange (PBX) 32. The PBX 32 can include a switching network and a processor or other logic to control connecting an inbound (or transfer) transaction with an internal routing point or initiating an outbound call from the system 10. As one example, the PBX 32 can be an internet protocol (IP) PBX configured for communication using an internet protocol. The PBX 32 can be integrated with a public switch telephone network (PSTN) gateway 34 as demonstrated by the PBX-gateway 36. The PBX-gateway 36 can communicate over the network 18 for sending outbound transactions or receiving inbound transactions relative to the server 14. As used herein, a transaction refers to a contact center transaction (e.g., a communication session), such as can include a telephone call, an email thread, an instant messaging session, an online chat session as well as other forms of multi-media communication that exist or have yet to be developed. A given transaction may also involve more than one type of media communication. The PBX 32 can be configured to accommodate any type of transactions. Each of the servers 12 and 14 can also include a PBX interface that provides for communication between the PBX 32 and the servers operating in the distributed system 10. For the example, where the PBX 32 is implemented as an IP-PBX, the PBX interface can correspond to an IP interface. Each of the servers 12 and 14 can be assigned a defined hierarchy so that an appropriate server can be selected for routing should a selected server be disconnected from the system.

FIG. 2 depicts an example of a primary server 50 that can be implemented in a contact center system, such as the contact center system 10 of FIG. 1. In the example of FIG. 2, the primary server 50 includes a data record writer 52 that is program to control writing data to a repository 55 (e.g., corresponding to the primary database 20 of FIG. 1). The data record writer 52 includes a set of functions (e.g., methods, routines) for processing requests and messages with data updates and writing the data to the repository 55.

In the example of FIG. 2, the data record writer 52 includes a conflict manager 54 that is programmed to resolve data conflicts relating to resource time intervals for the state of a given resource in the contact center system. As disclosed herein, the resource time interval can correspond to an agent log-in time interval, a wrapup time interval for an event, or a time interval associated with a physical asset (e.g., phone line or trunk, an idle time associated with a phone line or trunk) to name a few. The data record writer 52 can include an incoming message handler 56 that is programmed to receive an incoming update message (e.g., a contact data record message) and process the message according to information contained therein. The update message can include data describing an event or state of a system resource and may be new or revised data for such resource. For example, the incoming message handler 56 can extract one or more data record from the incoming message and provide the corresponding extracted data to the conflict manager 54 for additional processing.

The incoming message handler 56 can also validate incoming messages and data contained in the messages. For example, the message handler 56 can evaluate the data to ascertain if the data record that is older than a user-defined threshold. For example, a two-week threshold can be defined such that the message handler 56 can discard the message if the contact data record has a start time that is earlier than the established threshold. Additionally, the message handler 56 can evaluate the data record to determine whether the log out time contained in a given message is greater than a given log-in time. If such condition exits, the message handler 56 can discard the incoming message. Additionally, if the incoming message already exists in local memory (e.g., it is cached locally in RAM) of the primary server, the message handler 56 can discard the message as being redundant. As another example, the incoming message handler 56 may also query the database repository and, if it is determined that the incoming message is already been stored in the repository, then the incoming message can be cached locally and respective operations can continue.

The conflict manager 54 includes a resolver 58 that can be programmed to resolve one or more conflicts relating to the time interval data associated with a given resource based on the update message. The conflict manager 54 can also include a control 60 that is programmed to control the conflict resolution process that is implemented by the conflict manager. The control 60, for example, may be programmed to control how and when conflicts are resolved.

As one example, the control 60 can be programmed to initiate conflict resolution in real time in response to detecting and validating an incoming update message via the message handler 56. Alternatively or additionally, the control 60 can be programmed to invoke the conflict manager periodically, such as can be done at a desired frequency or based upon monitoring server workloads, or at one or more predetermined times (e.g., as can be defined by an authorized user). In response to invoking the conflict manager 54, the resolver 58 can employ a database interface 62 to retrieve conflicting records from a repository, such as including the repository 55.

As a further example, the database interface 62 can include a query component 64 comprising instructions programmed to construct a query based on the update message. The query, for example, can be constructed as a well formed query statement (e.g., a SQL statement) programmed to request a set of records that conflict with the record or records contained in the update message. The query component 64 can be programmed to generate the query statement to fetch all such conflicting records, if any, that are stored in the repository 55. Additionally or alternatively, depending on whether such records are routinely sent to the primary database, the query may be issued to fetch corresponding conflicting records from each of the distributed databases in the contact center system.

FIG. 3 depicts an example of a query statement that can be utilized to fetch a set of conflicting records related to a resource time interval of a given system resource. For instance, the query component 64 can employ the query statement to locate conflicting records that relate to a given resource, such as defined by a resource identifier (e.g., "ResourceID" in the example of FIG. 3) that is extracted from the update message. The query can also constrain the query to data that is stored in a selected table or other section (e.g., a "resourceactivity" table) of the repository. The query component 64 also constructs the query based on timing information (e.g., start time and end time for the state of the given resource) also contained in the update message, such as demonstrated in FIG. 3. In response to the query, the query component 64 can receives a set of results from the database repository that includes a set of records that conflict with the record in the incoming contact data record message from the remote server.

The query component 64 can provide the conflict manager 54 with the result set of conflicting records (if any) that is returned in response to the query. As disclosed herein, inconsistent information in the resource time interval for the state of a given resource may be recorded differently at different servers in the system, such as due to disconnected servers or other malfunctions. For example, the resolver 58 further can be programmed to identify an earliest start time and the latest end time corresponding to the resource time interval for the given resource based on the information contained in the message and analysis of the returned results. The resolver 58 can employ the earliest start time and latest end time to determine a corrected resource time interval for the state of the resource. The resolver 58 can cause the corrected resource time interval to be stored in memory.

For example, the resolver 58 can employ a write component 66 in the database interface 62 to cause a corresponding corrected data record to be written to a repository, such as corresponding to the repository 55. If the results of the query fail to return any conflicting records, the resolver 58 can cause the write component 66 to insert the data record (e.g., a contact data record) in the incoming message to the repository 55. Additionally, a local instance of the corrected information can be cached in local memory of the primary server for processing any additional requests by other applications that may require use of such data.

By way of example, the primary server 50 can include a report generator 68 programmed to generate one or more reports, such as can include information related to resource utilization in the contact center system. The system thus can also include a user interface 70 to enable a user to enter parameters for which the report is to be generated, such as including the type of report, the time range for the report and other related parameters. Such parameters may vary depending upon the type of report being generated and the configuration of the system. Those skilled in the art will understand and appreciate various types of reports, including real time reports and historical reports, which can be generated to provide an authorized user with information about contact center operations, employee behavior and the like.

As mentioned above, the conflict manager 54 can be triggered in various ways, including in response to reestablishing a connection between a remote server and a primary server, at a predefined time or periodically (e.g., as defined by the control 60) as well as in response to fetching the data such as in response to a request from the report generator 68 that is to utilize the data. Similarly, for example, the report generated can invoke the conflict manager 54 to resolve conflicts (e.g., in a JIT manner) relating to resource time intervals for each respective resource for which a given report is being generated based on data relating to the state of a given resource within the contact center system (e.g., an agent, a phone line or trunk, hunt group or the like). The report generator can present the resulting report to the user via an appropriate output device (e.g., display, printer, email or other form of output) following resolution of conflicts in resource time intervals such as disclosed herein.

The primary server 50 further may employ the routing control 72 to route transactions to respective agents in the contact center, which can vary according to the state of the agents. For example, if an agent is logged into the system and thereby also logged into each corresponding group to which the agent is assigned, an incoming call may be routed to an agent based upon routing rules and the like. The routing control 72 can employ routing rules and policies for routing transactions for the system. For instance, the routing control 72 can route such transaction to a route point, such as can correspond to an IRN. Such destinations for a given transaction can include services, call control scripts, agent queues and devices. For example, an inbound call to the distribution module can be reached by dialing an extension number, corresponding to an IRN, which is linked to a route point. An inbound transaction to a given IRN can also be routed to a transaction control script that provides a set of actions that are performed on a respective transaction according to logical and/or physical events or conditions. As another example, an IRN can be associated with a group, in which case call can be routed to a corresponding group server for routing the transaction to an available agent that belongs to such group based upon the routing rules that have been established. If the routing control 72 determines that no appropriate agent for such group is available for routing the incoming transaction, the distribution module can send the transaction to a corresponding group queue. Similar routing control can be implemented at other servers in the distributed system for receiving and handling transactions from a corresponding PBX implemented in the contact center system.

A group manager 74 can be programmed to assign and control assignment of agents to respective groups. For example, the group manager 74 may employ the user interface 70 to provide user input mechanisms for identifying and naming groups, identifying servers on which such groups reside and other parameters for defining and assigning groups within the contact center system. As described herein, if a given agent is logged in to the contact center system, the agent is automatically logged into each group to which the agent has been assigned via the group manager 74.

Figure 4:
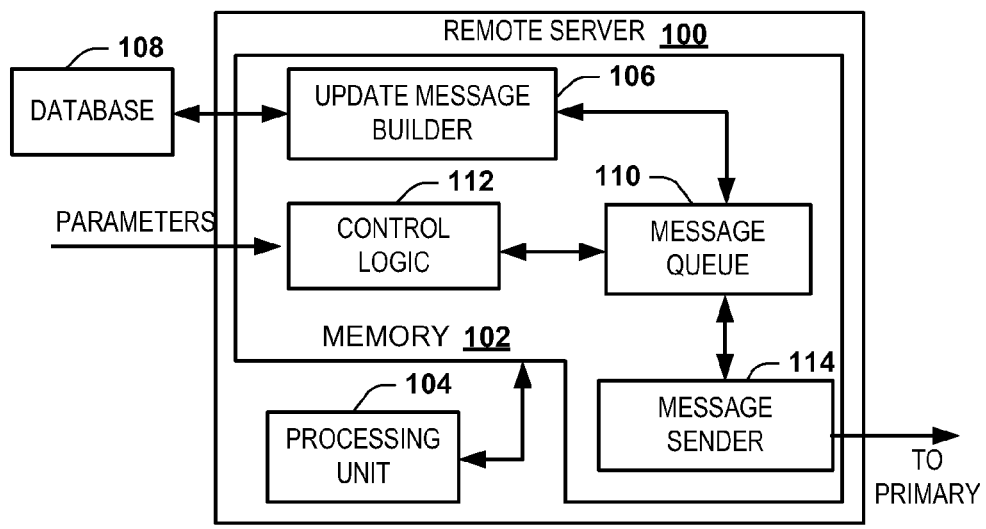
FIG. 4 depicts an example of a remote server that can be implemented in a contact center system according to an embodiment.

FIG. 4 depicts an example of functionality that can be implemented at a remote server system 100 related to sending messages for updating contact data records for a contact center system. The remote server 100 can also be programmed with relevant contact center control functions that have been omitted for sake of simplicity. In the example FIG. 4, the remote server 100 includes memory 102 that stores computer readable instructions for performing various functions thereof. A processing unit 104 is configured to access the memory and execute the instructions stored in the memory. The memory 102 includes code corresponding to an update message builder 106 that is programmed to construct an update message corresponding to a contact data record that has been created or modified. For example, the contact data record can include a resource time interval having a start time and an end time associated with a resource in the contact center system. Such information can be stored in a corresponding database 108 that is associated with the remote server 100. The update message builder, for example, can construct the message including the destination address corresponding to the primary server or repository associated therewith as well as pertinent information that is to be updated.

A given update message can be placed in a corresponding message queue 110. The message queue 110 can correspond to a data structure, such as a first-in-first-out (FIFO) in a predetermined address space in the memory 102 of the remote server 100. The message queue 110 can have a predefined size designed to hold a plurality of messages such that if additional messages exceed the allotted number, new messages can be discarded. Alternatively additional space may be added to the message queue 110 automatically to thereby increase its size beyond the established amount to accommodate additional messages.

Control logic 112 can be programmed to control handling of messages within the message queue 110. The control logic 112, for example, can establish a time window during which messages can be stored within the message queue 110. As an example, a default time window of about two hours can be set such that during a disconnect condition, the message queue 110 can store messages for two hours from the time of that disconnect occurred. Messages that occur after the established time window can be discarded. Alternatively, the control logic 112 can control the size and time duration during which messages are stored in the message queue 110 based upon a set of parameters. Such parameters can be entered into the primary server via a user interface (not shown).

The control logic 112 further can control when update messages are removed from the message queue 110 and sent to the primary server. For example, the control logic 112 can monitor the connection with remote server and, in response to detecting a reconnect, the control logic 112 can cause messages to be sent from the queue 110 to a message sender 114. The message sender 114 can in turn send the respective messages to the primary server. The message sender 114 can be part of any sort of messaging system and employ a corresponding message protocol to deliver the messages via a corresponding communication link that exist between the remote server 100 and the primary server. For example, the message sender 114 can send the respective messages using a TCP/IP protocol or other communication protocol (e.g., including conventional and proprietary protocols) for sending messages within the contact center.

Figure 5:
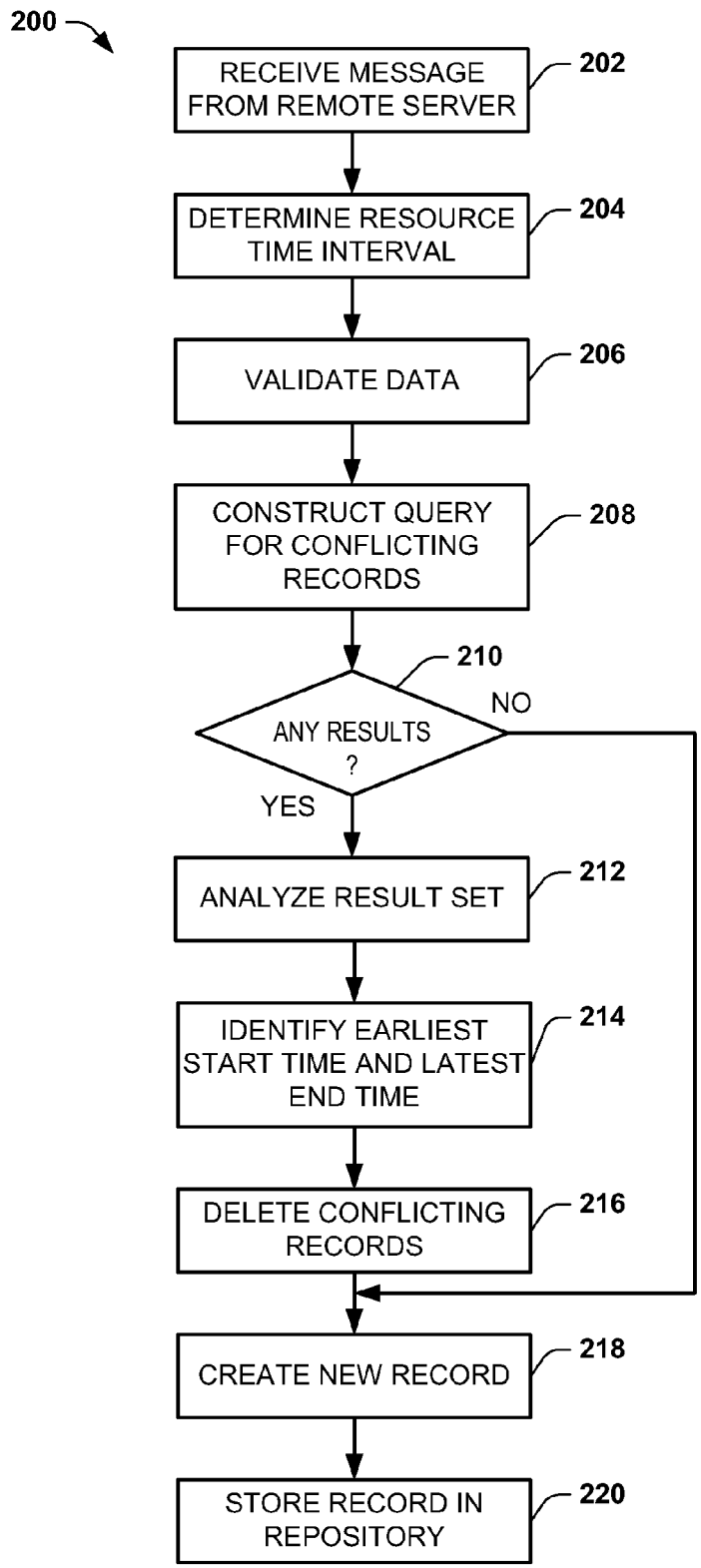
FIG. 5 is a flow diagram depicting an example method for resolving resource time information associated with a resource in a distributed system.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders and/or concurrently from that shown and described herein. The method can be implemented as computer readable instructions, such as can be stored in a non-transitory medium, such as a memory device. The instructions in the medium may be executed by a processing unit (e.g., the processing unit 26 of FIG. 1).

FIG. 5 depicts an example of a method that can be implemented to resolve conflicts related to resource time intervals for one or more resources within a distributed computing system. The method begins at 202 in which a message is received from a remote server (e.g., remote server 12 of FIG. 1). As disclosed herein, the message can include one or more contact data record, including data identifying a resource time interval. For example, the resource time interval can represent a time interval, including a start time and an end time corresponding to a state of a corresponding resource in the distributed system. As one example, the time interval can correspond to a log-in interval including a log-in time and a log out time for an agent within a contact center system such as disclosed herein.

At 204, the resource time interval for the corresponding resource is determined. At 206, the data is validated (e.g., by the message handler 56 of FIG. 2) to condition future processing of the data. For example, if the data cannot be validated the message and data contained within the message can be discarded. For example, if the data is stale or is redundant of data already received and stored, the data record can be discarded. After the data has been validated, the method proceeds to 208.

At 208, a query is constructed for identifying conflicting records in repository such as can include one or more databases (e.g., databases 16 and 20 of FIG. 1). The query can be made to the repository to fetch any conflicting records corresponding to the particular contact data record in the message received at 202. For example, the query can be constructed (e.g., by the query component 64 of FIG. 2) based on a resource identifier and timing information contained in the message received at 202.

At 210, a determination is made if there are any results to the query. If a result set is returned (YES), the result set can be analyzed at 212. The result set can be stored (e.g., cached) in local memory for further comparison to locate pertinent data, such as including conflicting data for a shared resource. At 214, an earliest start time and a latest end time can be identified from the result set. The data analysis and identification of start and end times at 212 and 214 can be an iterative (e.g., loop) process in which each data record in the result set is evaluated relative to each other to ascertain the earliest start time and the latest end time. At 216, conflicting data records can be deleted from the system. This can include removing entries from each of the databases in which they are stored.

At 218, a new data record can be created. The new data record can correspond to the data record that is received at 202 but identify the earliest start time and latest end time identified at 214. This new data record can be cached in local memory. Additionally, at 220 the corresponding new data record can be stored in the repository, such as in the primary database. This corresponding record can then be propagated via replication process for synchronization among the databases within the system.

If the determination at 210 determines that no result sets are returned, indicating that no conflicting records exist, the method can proceed from 210 to 218 and create a corresponding new data record in which the data record in the message received at 202 corresponds to this new data record. Such data record can then also be stored in the repository at 220.

It will be appreciated that the conflict resolution can occur automatically in response to receiving a message. Alternatively, the conflict resolution process can be triggered by an event or operate according to a predetermined schedule or based on other controls such as disclosed herein.

In view of the foregoing, the systems and methods disclosed herein can be employed to accurately aggregate data that characterizes resource time intervals from multiple sources in a distributed system. Even though the sources can possibly disconnected at times due to their distributed configuration, systems and methods can keep such data consistent, and can do so real-time.

What has been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
   memory for storing computer readable instructions;
   a processing unit for accessing the memory and executing the computer readable instructions, the computer readable instructions comprising:
      a conflict manager programmed to receive a message from a remote server following a re-connection between the remote server and a primary server, the message from the remote server including a resource time interval associated with a state of a given resource in a distributed system, the conflict manager being programmed to derive a corrected resource time interval for the state of the given resource based on the message from the remote server and conflicting records in a primary database.

2. The system of claim 1, wherein the corrected resource time interval for the state of the given resource comprises one of the resource time interval in the message from the remote server, a selected resource time interval stored in the primary database or an aggregate resource time interval derived from records stored in the primary database and the message from the remote server.

3. The system of claim 1, wherein the resource time interval comprises a start time and an end time for the state of the given resource.

4. The system of claim 1, wherein the given resource comprises an agent resource within a distributed contact center system comprising a plurality of distributed remote servers and distributed databases, the conflict manager being programmed to aggregate a set of conflicting records, if any, into a corresponding contact data record representing the corrected resource time interval for the state of the respective agent resource.

5. The system of claim 4, wherein the resource time interval in the corresponding contact data record comprises one of a login time interval for the agent resource and a wrapup time interval for an activity of the agent resource.

6. The system of claim 4, wherein the corresponding contact data record represents the resource time interval for the state of the respective agent resource including an earliest start time and latest end time derived based on evaluation of start times and end times from the set of conflicting records associated with the respective agent resource.

7. The system of claim 4, wherein, when the respective agent is logged into the contact center system, the respective agent is logged into each group server for each respective group to which the respective agent is assigned according to a predetermined contact center policy, such that the conflict manager enforces the contact center policy.

8. The system of claim 1, wherein the conflict manager is invoked to derive the corrected resource time interval in response to each request for data that includes the resource time interval associated with the state of the given resource.

9. The system of claim 1, wherein the computer readable instructions further comprise a report generator programmed to generate a report based on the corrected resource time interval for the state of the given resource.

10. The system of claim 9, wherein the conflict manager is invoked to derive the corrected resource time interval based on data used by the report generator.

11. The system of claim 1, wherein the conflict manager is programmed to derive the corrected resource time interval automatically in response to establishing a connection between the remote server and the primary server.

12. The system of claim 1, wherein the computer readable instructions further comprise a control programmed to control invoking the conflict manager to derive the corrected resource time interval.

13. The system of claim 1, wherein the computer readable instructions further comprise a write component programmed to store the corrected resource time interval as part of a record in a repository.

14. The system of claim 1, wherein the resource time interval includes a start time and an end time, the computer readable instructions further comprising a query interface to query the distributed system for a set of conflicting data records associated with the given resource based on the start time and the end time for the resource time interval.

15. The system of claim 1, wherein the remote server comprises a group server that resides remotely from the primary server, wherein the computer readable instructions further comprise a group manager programmed to assign agents to a group serviced by the group server, such that, when the group server is disconnected from the primary server, data representing the state of the given resource at the group server is stored independently from data representing the state of the given resource at the primary server.

16. The system of claim 1, wherein the computer readable instructions further comprise:
   a message builder at the remote server programmed to construct the message;
   a message queue at the remote server configured to hold the message in memory; and
   queue logic programmed to control sending the message from the remote server to the primary server that comprises the conflict manager.

17. A method comprising:
   determining resource time data for an update contact data record corresponding to a state of a given resource in a distributed contact center system;
   querying a repository for conflicting data records associated with the given resource based on the resource time data; and
   resolving any inconsistency for the resource time data based on results to the querying and the update contact data record.

18. The method of claim 17, wherein the resource time data comprises a start time and an end time for the state of the given resource, the method further comprising:
   identifying an earliest start time and a latest end time for the state of the given resource based on the resource time data returned in response to the querying and the resource time data for the update contact data record;
   deleting conflicting contact data records, if any; and
   creating a new contact data record based on the earliest start time and the latest end time for the state of the given resource.

19. A distributed contact center system comprising:
   a plurality of distributed servers comprising a primary server and at least one remote server connected via a communications link;
   a plurality of distributed databases configured to store contact center data;
   a conflict manager, programmed at one of the plurality of distributed servers, to derive a corrected resource time interval for a state of a given resource in the distributed contact center system based on analysis of a set of at least one conflicting contact data records for the given resource stored as part of the contact center data.

20. The system of claim 19, wherein the conflict manager further comprises:
  a resolver programmed to employ a query component to construct a query based on a resource time interval represented in an update contact data record for the given resource, the resolver deriving a start time and an end time for the corrected resource time interval based on aggregating relative start times and end times provided in results to the query and in the update contact data record; and
  a control programmed to control triggering the resolver.

* * * * *